United States Patent [19]

Gibbon

[11] Patent Number: 5,370,733

[45] Date of Patent: Dec. 6, 1994

[54] FLEXIBLE, HEAT-RESISTANT REFLECTIVE PAINT, PAINTED ELASTOMERIC COMPONENTS AND METHODS

[75] Inventor: Robert M. Gibbon, Fort Worth, Tex.

[73] Assignee: JMK International, Inc., Fort Worth, Tex.

[21] Appl. No.: 73,268

[22] Filed: Jun. 7, 1993

Related U.S. Application Data

[63] Continuation of Ser. No. 860,404, Mar. 30, 1992, abandoned.

[51] Int. Cl.⁵ .......................................... C09D 183/08
[52] U.S. Cl. ........................ 106/287.16; 427/376.2
[58] Field of Search ............... 428/328, 447, 492; 427/376.2; 106/287.12, 287.13, 287.14, 287.15, 287.16; 528/18, 23

[56] References Cited

U.S. PATENT DOCUMENTS

| | | | |
|---|---|---|---|
| 4,169,185 | 9/1979 | Bhatia | 428/328 |
| 4,292,087 | 9/1981 | Bell | 106/193 M |
| 4,461,854 | 7/1984 | Smith | 523/571 |
| 4,499,135 | 2/1985 | Mitchell et al. | 428/137 |
| 4,588,645 | 5/1986 | Ogawa et al. | 428/447 |
| 4,731,294 | 3/1988 | Pouchol et al. | 428/447 |
| 4,741,965 | 5/1988 | Zerfass et al. | 428/447 |
| 4,865,911 | 9/1989 | Blizzard | 428/285 |
| 4,929,691 | 5/1990 | Fillmore et al. | 525/497 |
| 4,929,703 | 5/1990 | Maruca et al. | 525/23 |
| 5,024,863 | 6/1991 | Gibbon | 427/387 |
| 5,063,012 | 11/1991 | Gibbon | 264/129 |
| 5,114,794 | 5/1992 | Sudo et al. | 428/447 |

FOREIGN PATENT DOCUMENTS

| | | |
|---|---|---|
| 0003760 | 2/1979 | European Pat. Off. . |
| 0202178 | 3/1986 | European Pat. Off. . |
| 1004893 | 4/1964 | United Kingdom . |

*Primary Examiner*—Mark L. Bell
*Assistant Examiner*—A. Wright
*Attorney, Agent, or Firm*—Jefferson Perkins

[57] ABSTRACT

A painted elastomeric component capable of withstanding temperatures within the range of at most 32° F. and at least 500° F. and having good flexibility and reflectivity of heat and capable of deformation without damage to the paint. The elastomeric component has a painted surface. The coating of paint covering the painted surface includes about 100 parts by weight of a room temperature vulcanizing sealant, about 300 to 1,000 parts by weight of an aromatic or aliphatic solvent and about 20 to 200 parts by weight of metallic particulate material.

8 Claims, 2 Drawing Sheets

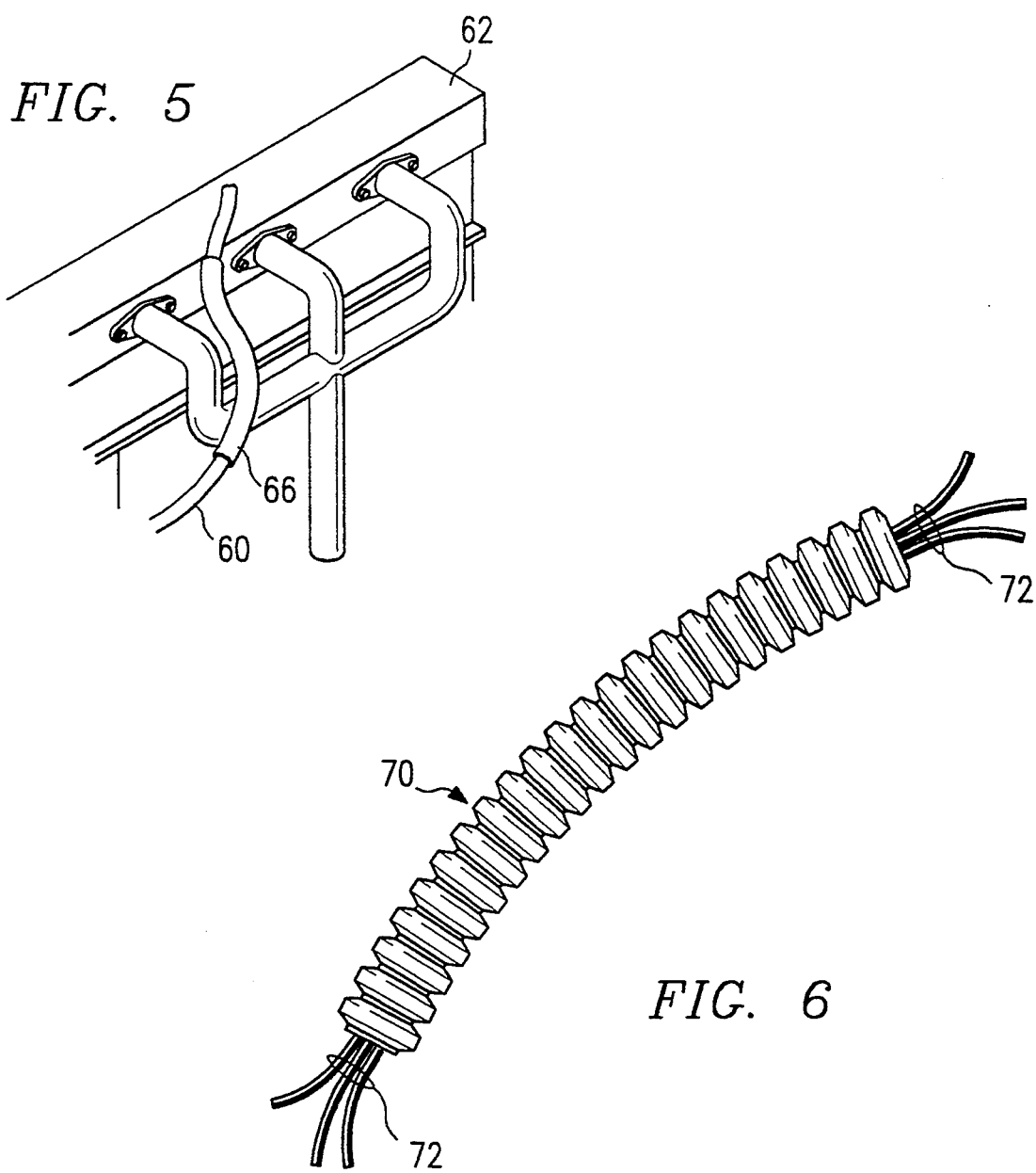
FIG. 5
FIG. 6
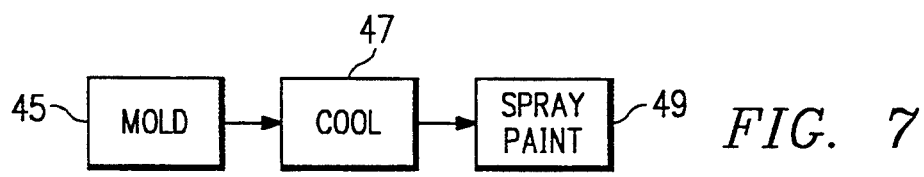
FIG. 7
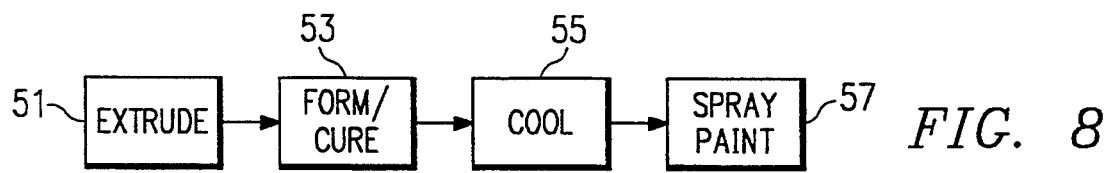
FIG. 8

FLEXIBLE, HEAT-RESISTANT REFLECTIVE PAINT, PAINTED ELASTOMERIC COMPONENTS AND METHODS

RELATED APPLICATIONS

This application is a continuation of application Ser. No. 07/860,404, filed Mar. 30, 1992, now abandoned. This Application is related to pending application Ser. No. 08/058,119 filed May 5, 1993.

TECHNICAL FIELD OF THE INVENTION

The present invention relates to components for reducing the degrading effect of heat upon elastomeric engine components and, more particularly, to an improved painted elastomeric component that resists cracking and has improved flexibility, and method for making same,

BACKGROUND OF THE INVENTION

A variety of elastomeric materials are used as components found in the engine compartment of a vehicle. High temperatures generated by many internal combustion engines have adversely affected the elastomeric materials, such as those used in spark plug boots, ignition wires, engine gaskets and the like. Such temperatures often exceed 500° F. and, with time, cause the elastomeric materials to become brittle, cracked and worn. In the area of spark plug boots, such wear reduces the effectiveness of the boot seal in maintaining and protecting the spark plug and its electrical connection to the ignition wire. Various devices and methods have been introduced to protect such elastomeric components.

To provide spark plug boot protection in such high temperature environments, a variety of expensive and custom made heat shields have been used. U.S. Pat. No. 4,671,586, issued Jun. 9, 1987 to DeBolt, shows a spark plug shield and boot assembly which includes a heat shield formed in the shape of a thin walled cylindrical shell of aluminum or other lightweight metal which peripherally surrounds the elastomeric boot. U.S. Pat. No. 3,881,051, issued Apr. 29, 1975 to Berry, shows a spark plug boot formed of silicone rubber and having a metal screen integrally molded therein, the screen extending through one end of the boot and into engagement with the spark plug shell to provide an electrical ground for the screen. While such shields are generally effective for their intended purpose, they are costly and fail to meet the goals of improved installation, operation and serviceability.

U.S. Pat. No. 5,063,012, issued Nov. 5, 1991 to Gibbon (Gibbon '012), shows an elastomeric component sprayed with a heat resistant, heat reflecting resin-based paint. While the elastomeric component itself is capable of withstanding the degrading effects of heat, the paint is less than optimally flexible.

The Gibbon '012 composition used a resin-based paint made from silicone resin, SR125. SR125 is a silicone resin, made using the monomers dimethyl dichlorosilane and methyl trichlorosilane. This coating is relatively inflexible and permits little elongation of the painted component. Stretching a spark plug boot painted with a resin-based paint, to install an ignition cable, may cause the paint to develop cracks, resulting in the paint tending to flake off. Consequently, an exposed, unpainted portion of the elastomeric component may be left exposed to the surrounding environment.

In view of the prior art attempts, a long felt need continues to exist for a heat-reflective paint which, when dried, resists cracking and provides good adhesion and improved flexibility, even under high temperature conditions.

SUMMARY OF THE INVENTION

According to the invention, a painted elastomeric component is provided, which is capable of withstanding temperatures within the range of at most 32° and at least 500° F. and is capable of deformation without damage to the paint. The paint is heat-reflective, temperature refractory and has good flexibility and adhesion properties.

According to one aspect of the invention, a paint is provided that has good flexibility, good adhesive properties, and is heat-reflective and temperature refractory. The paint includes about 100 parts by weight of a room temperature vulcanizing sealant (R.T.V. sealant), about 300–1000 parts by weight of an aromatic or aliphatic solvent, and about 20–200 parts by weight of metallic particulate material. The sealant includes a polysiloxane, a crosslinking agent and a curing catalyst, preferably chosen from the family of dialkyl tin diacylates. In a particularly preferred composition, the paint includes about 100 parts by weight of room temperture vulcanizing (R.T.V.) sealant, 400 parts by weight of an aromatic or aliphatic solvent, such as xylene, and 50 parts by weight of a metallic particulate material, such as aluminum flake.

According to a second aspect of the invention, a painted elastomeric component is provided, in which the component comprises silicone rubber. First, an elastomeric component is formed into a desired shape for use in the engine compartment of a vehicle. In the case of a silicone rubber component, the paint, as discussed supra, may be applied directly on the surface of the component.

According to a third aspect of the invention, a painted component is provided comprising an organic rubber or plastic surface. The component is formed as described supra; however, the surface of an organic rubber or plastic surface is initially primed with a silane-based primer.

Painted elastomeric components of the invention include elastomeric engine parts subjected to a high-temperature environment, such as spark plug boots, engine gaskets, ignition wires, hoses and the like. The component is preferably spray painted with the heat-reflective metal containing composition to thereby create a reflective surface on the exterior of the component.

The present invention confers several technical advantages over the prior art. The invention yields an effective and commercially acceptable painted elastomeric component that is capable of withstanding extreme temperatures without significant degradation. The reflective, temperature refractory surface reduces the effects of radiant heat present in the surrounding environment and thereby improves the life expectancy of the component. Additionally, the paint possesses good adhesion properties and resists cracking and flaking.

BRIEF DESCRIPTION OF THE DRAWINGS

Further aspects of the invention and their advantages may be discerned from reading the following detailed description when taken in conjunction with the drawings, in which:

FIG. 5 is an isometric view of an exhaust manifold and rubber hose for which the invention may be used;

FIG. 6 is a flexible conduit pipe used to lead and protect a plurality of wires;

FIG. 7 is an operational diagram explaining the application of the inventive method to an existing injection molding process; and FIG. 8 is an operational diagram explaining the application of the method of the invention to an existing extrusion process.

DETAILED DESCRIPTION OF THE INVENTION

Preferred embodiments of the present invention are best understood by referring to FIGS. 1 through 8 of the drawings, like numerals being used for like and corresponding parts of the various drawings.

REPRESENTATIVE PAINTED ELASTOMERIC COMPONENTS

The inventor has fabricated painted elastomeric components that exhibit excellent characteristics because of a synergism of their composition and the method of their manufacture.

Exterior surfaces of the following components are painted with a silicone-based, heat-reflective, temperature refractory paint according to the invention; components are preferably of silicone rubber such that no primer is necessary. Among other attributes, the painted elastomeric component is capable of withstanding temperatures within at least the range of 32° to 500° F.

Figure 1:
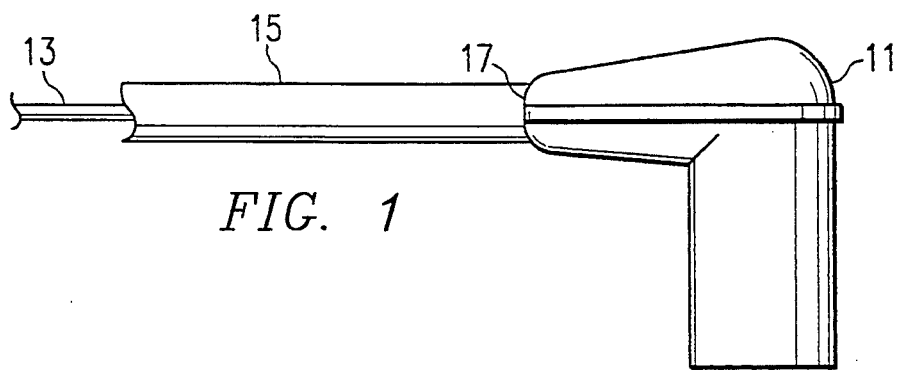
FIG. 1 is a side elevational view of a spark plug boot manufactured according to the method of the invention.

FIG. 1 is an elevational view of an injection molded spark plug boot 11, the construction of which will be familiar to those skilled in the art. The boot 11 includes an ignition wire 13 which is covered by a surrounding insulating material 15 to form a cable, the cable being received within an end opening 17 of the L-shaped boot. The interior of the boot 11 also typically contains a metallic connector cap (not shown) which will fit over and engage the electrode of a spark plug (not shown) to make an electrical connection therewith. Exterior surfaces of the spark plug boot and cable are painted according to the invention as hereafter described. Preferably, the spark plug boot and cable are made of silicone based rubber. Silicone rubber is a substrate for which no primer is necessary because the paint of the invention will readily adhere to the surface of the silicone rubber. Other rubbers and plastics will initially have to be primed, as hereinafter described, before a heat-reflective paint according to the invention may be applied.

Figure 2:
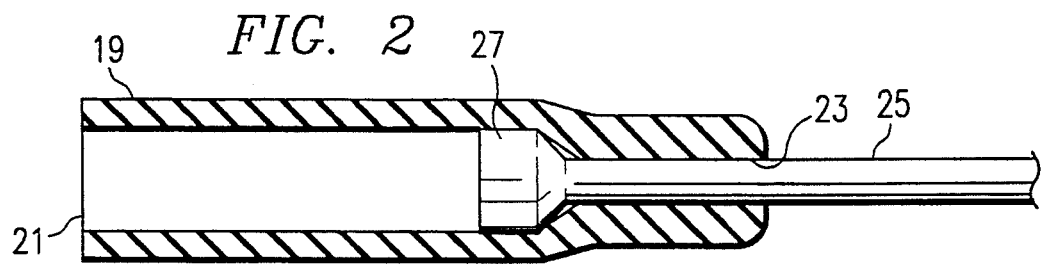
FIG. 2 is a side, cross-sectional view of another style spark plug boot manufactured according to the method of the invention.

FIG. 2 shows another typical embodiment, a spark plug boot 19 of the type having a more elongate, tubular configuration. The tubular boot 19 includes an internal bore 21 which is reduced in internal diameter to an internal sleeve 23, whereby an ignition cable 25 having an associated connector cap 27 can be received and engaged within the bore 21. The boot and cable of FIG. 2 will be painted according to the invention, as discussed supra.

Figure 3:
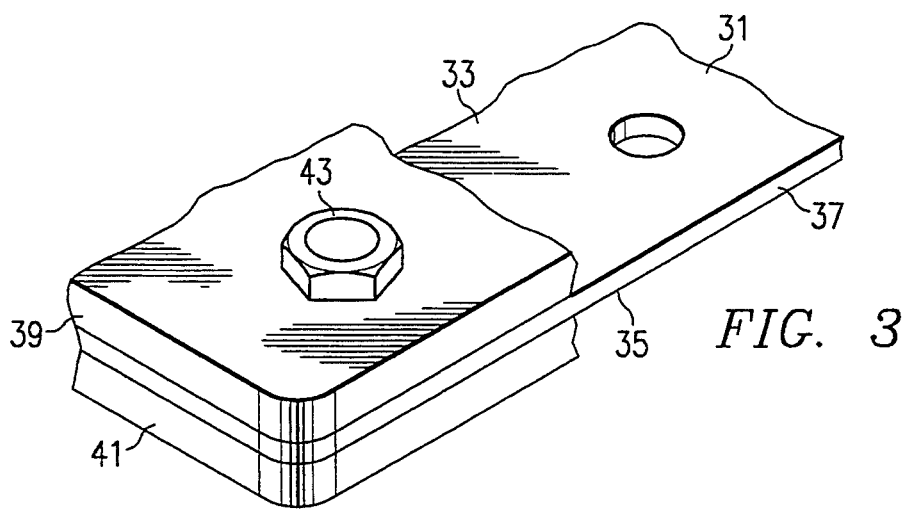
FIG. 3 is an isometric view of an engine gasket manufactured according to the method of the invention with the confronting metal surfaces of the engine shown broken away for ease of illustration.

FIG. 3 shows another engine component, in this case a valve cover gasket 31, having planar upper and lower surfaces 33, 35 separated by a thickness which defines a side edge 37. The gasket is adapted to be received between the confronting surfaces 39, 41 of a vehicle engine, for instance the vehicle valve cover. The confronting surfaces are held in position, as by a bolt 43. Edge or non mating surface 37 will be painted with the heat-resistive, heat-reflective paint, according to the invention, as discussed infra.

Figure 4:
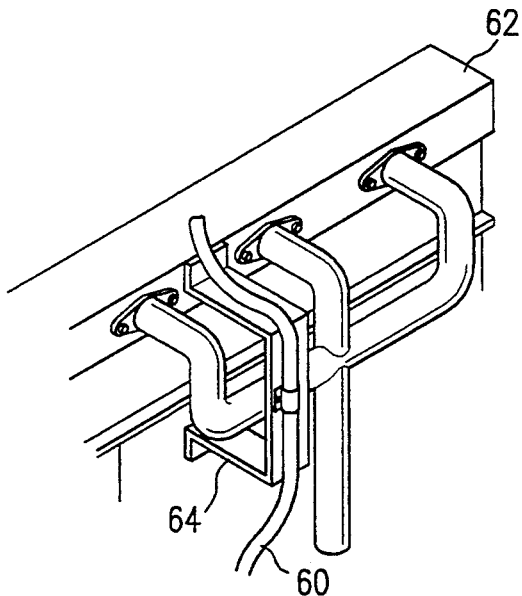
FIG. 4 is an isometric view of an exhaust manifold and rubber hose protected by an expensive metal heat shield according to the prior art.

FIGS. 4 and 5 show a hose protected from an exhaust manifold, according to the prior art and present invention, respectively. Illustrating the prior art, FIG. 4 shows a rubber hose 60 protected from exhaust manifold 62 by an expensive metal heat shield 64. FIG. 5 illustrates a use of a hose and sheath fabricated according to the present invention which avoids the use of expensive metal heat shields near exhaust manifold 62. A sheath 66, coated with the heat-reflective metallic paint according to the invention, is installed to extend above and below a manifold hot spot. The sheath 66 protects hose 60 from the surrounding environment. Additionally, the hose 60 could also be painted according to the invention.

FIG. 6 shows a plastic cylindrical conduit pipe 70 which could be used in an engine compartment to lead one or more wires 72 (three shown). The exposed surface of the conduit pipe 70 is painted with a silane-based primer and then with the heat-reflective paint, thereby protecting conduit pipe 70 and the wires 72 from extreme temperatures.

ELASTOMER COMPOSITION

The vulcanizible elastomeric materials useful in practicing the present invention will include any curable materials capable of being formed by the method to the required shape. Thus, the components shown in FIGS. 1 and 2 can be formed from a variety of elastomeric materials including natural and synthetic organic rubbers, for instance EPDM, SBR, butyl, nitrile and polychloroprene rubbers. The components of the invention can also be formed of silicone rubbers, which are preferred (1) because of their stability at elevated temperatures and resistance to contamination by engine fumes, leakage and the like, and (2) because, as a substrate for the paint disclosed herein, they require no primer. A typical silicone rubber composition useful for practicing the invention contains about 100 parts silicone polymer, about 40 parts filler, from about 0.5 to 2.0 parts catalyst and from 0 to 10 parts of other enhancement additives.

Typical silicone polymers include polydiorganosiloxane polymers with a small number of vinyl groups and a larger number of methyl groups on the polymer chain. The vinyl level is preferred to be in the range of about 0 to 5 mole percent with a molecular weight of the polymer typically being about 1 million.

Typical fillers include fume silica, precipitated silica, ground quartz, diatomaceous earth, calcium carbonate and iron oxide. Other conventional enhancement additives can be present as well, such as heat stabilizers, structure control additives, process aids and pigments.

The following example is intended to be illustrative of the preferred silicone rubber compositions which can be used to practice the invention:

| | |
|---|---|
| Methyl vinyl polysiloxane polymer with 0.2M % vinyl content | 48.0 parts |
| Structure control additive | 3 parts |
| Fume silica | 7 parts |
| Precipitated silica | 7 parts |
| Accelerator Vi (methoxy)$_3$ Si | 0.2 parts |
| Ground silica | 35.0 parts |
| 2.5-Dimethyl-2.5 Bis - (t-Butylperoxy) Hexane | 0.8 parts |

Silicone rubber compositions of the above type can be cured using conventional techniques, for instance, by using known heat activated catalysts such as 2,4-dichlorobenzoyl peroxide or dicumyl peroxide, or a combination of the two, or alternatively with platinum catalysts. Other curing methods would include, for instance, radiation cure as taught in U.S. Pat. No. 4,737,324, issued to Gibbon, Apr. 12, 1988, and assigned to the assignee of the present invention.

PROCESS

In a method of manufacturing an elastomeric component according to the invention, the elastomeric component is first formed into the desired shape. Thereafter, a heat-reflective surface is created on the elastomeric component by applying a heat-reflective metal-containing composition thereto. Although the metal containing component can be compounded into the rubber composition, it is preferably applied as a spray paint after the component is formed and cured. The method used to form the engine components shown in FIGS. 1-3 and 5-6 is illustrated schematically in FIGS. 7 and 8.

FIG. 7 illustrates the steps in forming the spark plug boot 11 and gasket 31. The uncured, compounded polymer can be formed into the desired shape by injection molding in a mold 45. Injection molding processes for manufacturing spark plugs are well known and described, for instance, in U.S. Pat. No. 2,745,875, issued May 8, 1956, to Simpkins, et al. After heat curing in the mold 45, the component is removed and cooled in a cooling stage 47 and thereafter spray painted or dip coated at a painting stage 49.

The component is preferably spray painted with a reflective metal containing composition to thereby create a reflective surface on the exterior of the elastomeric component. The entire exterior surface will be typically spray painted with the heat reflective, heat resistant paint. It is preferred that for a component such as spark plug boot 11 shown in FIG. 1, the cable 15 also be painted. In the case of the gasket 31 (FIG. 3), typically only the edge region 37 is painted since this is the only exposed region between the confronting surfaces 39, 41. Where the spark plug boot 11 is made from an elastomer other than silicone rubber, a silane-based primer is applied to the surface prior to painting same with the heat-reflective paint.

FIG. 8 briefly depicts the steps used in manufacturing the extruded boot 19. The uncured compounded polymer is extruded through an extrusion die 51. After passing through one or more partial cure and forming steps, depending on the shape of the finished article, it is finally cured at a curing station 53. The boots are then cooled at a cooling station 55 and thereafter passed to a paint station 57 for painting the exterior of the extruded tubular member. Extrusion methods for forming spark plug boots are well known in the art and are described, for instance, in U.S. Pat. Nos. 4,737,324 and 4,551,293, assigned to assignee of the present invention, the disclosure of which is hereby incorporated by reference.

PAINT COMPOSITION

The paint used in the painted elastomeric component according to the invention comprises a room temperature vulcanizing sealant (R.T.V. sealant), an aliphatic or aromatic solvent and metallic particulate material such as metallic flake.

Acceptable concentration ranges for the various ingredients comprising the paint formulation are as follows given in parts by weight:

| | |
|---|---|
| R.T.V. Sealant | 100 parts |
| Aliphatic or aromatic solvent | 300-1000 parts, preferably 400 parts |
| Metallic particulate material | 20-200 parts, preferably 50 parts |

THE SEALANT

The R.T.V. sealant preferably comprises a hydroxyl end stopped polydiorganosiloxane, a siliceous and/or calcareous filler, a crosslinking agent and a catalyst.

The polydiorganosiloxane is preferably a polydimethylsiloxane with little or no vinyl or other side chain substitutions, having a viscosity in the range of 10-500 poises and a molecular weight in the range of 25,000 to 90,000. Preferably, the polydiorganosiloxane has a viscosity in the range of 20-100 poises and a molecular weight in the range of 35,000 to 60,000. Most preferably, the polydiorganosiloxane is a hydroxyl-stopped polydimethylsiloxane with a viscosity of about 50 poises and a molecular weight of about 42,000. Polydimethylsiloxanes of this approximate viscosity and molecular weight will yield, after crosslinking or curing, a rubber having such flexibility that the resultant coating may be stretched by 100% or more without failure. This is a principal technical advantage over prior art resin-based compositions.

The siliceous and/or calcareous filler may comprise any of several fillers known in the art and combinations thereof. The filler preferably has a reinforcing component, such as may be constituted by fume silica, and a nonreinforcing component such as celite (diatomaceous earth), ground quartz, and/or clays. The fume silica may have a surface area in the range of 100-300 square meters per gram, and preferably has a surface area of about 130 square meters per gram. Fume silica is available under the trademarks Aerosil 130, Aerosil 200 and Aerosil 300, with Aerosil 130 being preferred.

The chosen crosslinking agent reacts, at ambient temperatures, with airborne moisture and the polydiorganosiloxane to produce crosslinking among the polymer chains. A preferred crosslinking agent is a substituted silane of the formula $SiR_1R_2R_3R_4$, where $R_1$–$R_4$ are various organic groups. $R_1$ may be either methyl or vinyl, and is preferably methyl. $R_2$, $R_3$ and $R_4$ may comprise any hydrolytically reactive group which will yield a reactive silohydroxy group upon exposure to water. For example, $R_2$, $R_3$ and $R_4$ may be methyl, vinyl, acetoxy, oximo or amidoxy. It is preferred that $R_3$ and $R_4$ be acetoxy, oximo or amidoxy.

In the instance of acetoxy or oximo groups, the crosslinking chemical reactions are as follows:

Acetoxy:

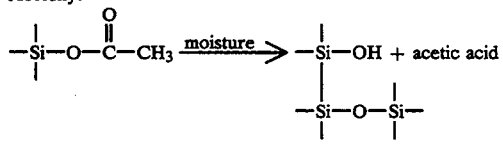

Oximo:

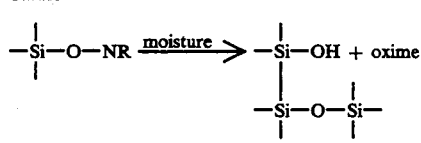

Preferred crosslinking or curing agents include methyl triacetoxy silane, dimethyl diacetoxy silane and methyl tris-(methylethyl ketoximo) silane.

Another usable family of crosslinking silanes are alkyl alkoxy silanes of the formula $SiR_1R_2R_3R_4$, where $R_1$ is methyl or vinyl and $R_2$, $R_3$ and $R_4$ are methoxy, ethoxy, methoxyethoxy and mixtures of these groups.

The sealant should include a catalyst in an amount sufficient to induce crosslinking or curing between the crosslinking agent as described supra and the polydiorganosiloxane. Preferred catalysts are in the family of dialkyl tin diacylates, with dibutyl tin dilaurate being particularly preferred. Depending on the desired cure rate, the dialkyl tin diacylate may be present in the sealant in the range of zero to one percent by weight.

The formulation for a typical "acetoxy" vulcanizing sealant formulation is:

| | |
|---|---|
| Hydroxyl end stopped polymer (polydimethylsiloxane) having viscosity of 50 poises | 100 parts |
| Fume silica A 130 | 15 parts |
| Celite superfloss | 10 parts |
| Methyl tri-acetoxy silane | 4 parts |
| Dibutyl tin dilaurate | 0.2 parts |

Known in the industry as 1 part R.T.V. sealant, this type of product is commercially available, e.g., General Electric silicone R.T.V. 102, 103, 106, 108 and Dow Corning's 732 product.

THE SOLVENT

The solvent can be any aliphatic or aromatic solvent capable of dissolving polysiloxane polymer. Possible solvents include xylene, toluene, hexane, heptane, octane, trichloroethane and methylene chloride. The appropriate concentration of the preferred solvent, xylene, is generally determined according to the desired protection for an elastomeric part. Very high levels of xylene could be used if it is desired that parts be heavily or double coated.

THE METALLIC PARTICULATE MATERIAL

The metallic particulate material may be any flake or powder recommended for use where the requirements of metallic luster, chrome-like appearance and smooth leveling are critical. Any pigment, flake or powder which gives the coating a metallic luster would be useful, such as bronze powder and aluminum powder and flake. Bright pigments such as titanium dioxide could be used as they would also give some reflectivity of the radiant heat. The required concentration of metallic flake may be determined by the coat weight required to give a complete reflective coating to cover any given surface. Aluminum flake is preferred. The preferred aluminum flake is a grade from Alcon - Toyo America, 7300 Alflake.

The paint of the present invention will adhere to silicone rubber surfaces without priming. However, if the paint is to be used on an organic rubber surface, such as EPDM, then the surface will initially have to be primed. Silane-based primers for organic rubber surfaces are generally well known in the industry and will chemically bond to the organic rubber and to the paint. Examples of silane primers are vinyl triethoxy silane and trimethoxy methacryloxy silane. The plastic conduit pipe 70 shown in FIG. 6 is primed with such a silane primer prior to application of the paint of the invention.

EXAMPLE I

A particularly preferred paint was formulated as follows, with constituents given in parts by weight:

| | |
|---|---|
| R.T.V. one part sealant | 100 parts |
| Xylene | 400 parts |
| Aluminum flake | 50 parts |

The sealant in turn had the following composition, with constituents given in parts by weight of the sealant:

| | |
|---|---|
| Hydroxyl end stopped polydimethylsiloxane having a preferred viscosity of 50 poises and molecular weight of 42,000 | 100 parts |
| Fume silica (Aerosil 130) | 15 parts |
| Diatomaceous earth (Celite superfloss) | 10 parts |
| Methyltriacetoxysilane | 4 parts |
| Dibutyl tin dilaurate | 0.2 parts |

To make the paint, the sealant was dissolved into xylene overnight and then the aluminum flake was mixed into the solution. When the aluminum flake was wetted out, the paint was ready to be applied to the component. This formulation provided paint that was flexible, such that even after drying, when the painted surface was flexed, the paint flexed with it and provided a high degree of heat reflectivity.

EXAMPLE II (PREDICTIVE)

Silicone spark plug boots of the form shown in FIG. 1 have their internal metal connectors removed for the purpose of experimentation. Among the boots are a basic black colored silicone spark plug boot; a black spark plug boot with the paint according to the invention applied to its exterior surface, with aluminum flake being used as the metallic component of the paint; a gray colored silicone spark plug boot; a black silicone rubber spark plug boot with a paint according to the invention applied to its exterior surface, with the metallic component this time being selected as bronze particles; a yellow colored silicone rubber spark plug boot; and a silicone rubber spark plug boot incorporating bronze powder. These boots are positioned a predetermined distance away from a heat source intended to approximately mimic an internal combustion engine. For example, a heat source having a temperature of 600° could be located at a distance four inches away from the boots.

Under these conditions, the spark plug boots as painted according to the invention are expected to yield temperatures in their interiors and in the immediate vicinities of their exteriors which are much below those for the nonpainted spark plug boots. Merely coloring the boots gray or yellow will give them little additional heat reflectivity; the measured temperatures of these boots are not expected to vary substantially from temperatures recorded for the black spark plug boot. Incorporating bronze into the boot imparts some additional heat reflectivity. However, superior heat reflectivity is obtained with the spark plug boots painted according to the invention. It is expected that the temperature inside of the boot in the above conditions may be reduced by as much as 60 degrees as compared to the standard black boot. Exterior temperatures in the immediate vicinity of the boot exterior take an even more dramatic drop: a reduction by as much as 180° F. can be expected as compared to temperatures recorded for the black boot. Temperature reductions in these amounts are expected to increase the useful life of the spark plug boots painted according to the invention, as compared to nonpainted spark plug boots.

EXAMPLE III (PREDICTIVE)

A conventional silicone rubber engine gasket and an engine gasket having side edges painted with aluminum containing silicone paint according to the invention may be compared to determine the radiant heat effects by placing the conventional and painted gasket between metal confronting surfaces similar to those present in an engine valve cover. After exposing the conventional and painted gasket to 300° F. for 20 minutes, the inside and outside temperatures are recorded. The temperature drop obtained inside the seal is expected to be about twenty degrees. The temperature drop obtained outside the seal is expected to be about thirty-five to forty degrees.

EXAMPLE IV (PREDICTIVE)

An organic rubber spark plug boot (EPDM) and a painted organic rubber boot (painted initially with a silane primer and then painted with the aluminum/silicone paint of the invention) are exposed to a temperature of 350° F., with each boot placed at a distance of 2 inches from the heat source, for 20 minutes. It is expected that while the painted boot will show no effect, the unpainted boot will be blistered and cracked.

In summary, an invention has been provided with several advantages. The automotive industry is demanding higher and higher temperature resistance in its component parts, with temperature requirements in excess of 500° F. being quite common for rubber parts in the engine compartment. Without the reflective surface provided by the method of the invention, spark plug boots and other elastomeric components subjected to temperatures in the range of 500° to 600° F. break down and become ineffective. Valve cover seal subjected to temperatures in excess of 500° F. by an exhaust manifold become embrittled and leak oil. The invention provides a flexible, reflective, temperature refractory surface on the elastomeric component by means of painting the surface thereof with the paint according to the invention. By providing a flexible, reflective surface on the elastomeric component, the paint coating survives torsion and flexion of the component. The outside and inside temperature of the component is reduced during operation, thereby prolonging the life of the component.

The method of the invention can be used to reduce the degrading effects of heat upon a variety of elastomeric components of the type typically utilized in a vehicle engine compartment, such as the engine compartment of a passenger automobile. These components include, for instance, spark plug boots, ignition wires and engine gaskets.

While the present invention has been described with the aid of the above detailed description and the examples, the invention is not limited thereto but only by the scope and spirit of the appended claims.

What is claimed is:

1. A method for making a flexible coating capable of at least one hundred percent elongation without failure and adapted for use on elastomeric components, comprising the steps of:
    dissolving a non-resinous, room temperature vulcanizing sealant including a polydiorganosiloxane having a viscosity in the range of 10 to 500 poises, a reinforcing filler, and a crosslinking agent of the formula $SiR^1R^2R^3R^4$ where $R^1$ and $R^2$ are organic groups and $R^3$ and $R^4$ are selected from the group consisting of acetoxy, oximo and amidoxy in an aromatic or aliphatic solvent;
    mixing in a metallic particulate material to form a coating solution;
    applying the coating solution to a surface; and
    curing the coating solution such that a coating is obtained which will exhibit a maximum elongation of at least 100% without failure.

2. The method of claim 1, wherein the mixing is performed until the metallic particulate material is completely wetted.

3. The method of claim 1, wherein the solution comprises:
    100 parts by weight of the sealant;
    about 300–1000 parts by weight of an aromatic or aliphatic solvent; and
    about 20–200 parts by weight of metallic particulate material.

4. The method of claim 1, wherein the solution comprises:
    100 parts by weight of said sealant, said sealant in turn comprising;
        77 parts by weight of a hydroxyl end-stopped polydiorganosiloxane;
        12 parts by weight of said reinforcing filler; and
        3 parts by weight of said crosslinking agent;
    about 300–1000 parts by weight of an aromatic or aliphatic solvent, selected from the group consisting of xylene, toluene, hexane, heptane, octane, trichloroethane and methylene chloride; and
    about 20–200 parts by weight of metallic reflective particulate material.

5. The method of claim 1, wherein the solution comprises:
    100 parts by weight of polydimethylsiloxane;
    400 parts by weight of xylene; and
    50 parts by weight of aluminum flake.

6. A method for forming a coated elastomeric component capable of withstanding environmental temperatures within the range of 32 degrees and 500 degrees Fahrenheit, and capable of deformation without damage to the coating, the coating capable of undergoing an elongation of at least 100% without failure, the steps comprising:

molding an uncured polymer by injection molding, heat curing and cooling to form a component;

coating said component with a coating composition comprising a non-resinous, room temperature vulcanizing sealant including a polydiorganosiloxane having a viscosity in the range of 10 to 500 poises, a reinforcing filler, and a crosslinking agent of the formula $SiR^1R^2R^3R^4$ where $R^1$ and $R^2$ are organic groups and $R^3$ and $R^4$ are selected from the group consisting of acetoxy, oximo and amidoxy, the coating composition further including an aromatic or aliphatic solvent and a metallic particulate material; and curing the coating composition to produce a coating which exhibits a maximum elongation without failure of at least 100%.

7. A method for forming a coated elastomeric component capable of withstanding environmental temperatures within the range of 32 degrees and 500 degrees Fahrenheit, and capable of deformation without damage to the coating, the steps comprising:

extruding an uncured polymer gum through a die;

curing and cooling the extruded gum to form a component;

coating said component with a coating composition comprising, prior to cure, a non-resinous, room temperature vulcanizing sealant including a polydiorganosiloxane having a viscosity in the range of 10 to 500 poises, a reinforcing filler, and a crosslinking agent of the formula $SiR^1R^2R^3R^4$ where $R^1$ and $R^2$ are organic groups and $R^3$ and $R^4$ are selected from the group consisting of acetoxy, oximo and amidoxy, the coating further including an aromatic or aliphatic solvent and a metallic particulate material and curing the coating composition to obtain a coating on the component which is capable of at least a 100% elongation without failure.

8. A coating composition which, when cured to a coating, will withstand environmental temperatures in the range of 32 to 500 degrees fahrenheit and be capable of an elongation of at least 100% without failure, comprising, prior to cure:

100 parts by weight of a nonresinous room temperature vulcanizing sealant including:
 a polydiorganosiloxane having a viscosity in the range of ten to five hundred poises;
 reinforcing filler; and
 a crosslinking agent of the formula $SiR^1R^2R^3R^4$, where $R^1$ and $R^2$ are organic groups and $R^3$ and $R^4$ are selected from the group consisting of acetoxy, oximo and amidoxy;

from 300 to 1000 parts by weight of an aromatic or aliphatic solvent; and about 20 to 200 parts by weight of a metallic particulate material.

* * * * *